(12) United States Patent
Bergmeier

(10) Patent No.: US 10,214,356 B2
(45) Date of Patent: Feb. 26, 2019

(54) TRANSPORTING ELEMENT FOR ACCOMMODATING AND TRANSPORTING SPHERICAL, CYLINDRICAL OR EGG-SHAPED ARTICLES, AND A COOKING APPLIANCE, PASTEURIZER OR COOLING UNIT

(71) Applicant: Gerd Bergmeier, Hiddenhausen (DE)

(72) Inventor: Gerd Bergmeier, Hiddenhausen (DE)

( * ) Notice: Subject to any disclaimer, the term of this patent is extended or adjusted under 35 U.S.C. 154(b) by 236 days.

(21) Appl. No.: 15/106,588

(22) PCT Filed: Dec. 22, 2014

(86) PCT No.: PCT/EP2014/079006
§ 371 (c)(1),
(2) Date: Jun. 20, 2016

(87) PCT Pub. No.: WO2015/097156
PCT Pub. Date: Jul. 2, 2015

(65) Prior Publication Data
US 2017/0001801 A1 Jan. 5, 2017

(30) Foreign Application Priority Data
Dec. 23, 2013 (DE) ........................ 10 2013 114 809

(51) Int. Cl.
*A23L 3/18* (2006.01)
*A47J 29/06* (2006.01)
(Continued)

(52) U.S. Cl.
CPC .......... *B65G 11/023* (2013.01); *A23B 5/0052* (2013.01); *A23B 5/04* (2013.01);
(Continued)

(58) Field of Classification Search
CPC ... A23L 3/18; A23L 3/185; A47J 29/06; A47J 37/045; A47J 37/047; B65G 2813/02772
(Continued)

(56) References Cited

U.S. PATENT DOCUMENTS 1,445,277 A 2/1923 Hansen
3,770,107 A * 11/1973 Michelbach ........... A01K 43/00
119/337
(Continued)

FOREIGN PATENT DOCUMENTS

DE 10010629 A1 9/2001
DE 60009458 T2 3/2005
(Continued)

OTHER PUBLICATIONS

International Search Report dated Mar. 18, 2015 in related International Application No. PCT/EP2014/079006.
(Continued)

*Primary Examiner* — Reginald Alexander
(74) *Attorney, Agent, or Firm* — Patent Portfolio Builders PLLC

(57) ABSTRACT

A transporting element for accommodating and for transporting spherical, cylindrical or egg-shaped articles, in particular foodstuffs, in particular eggs, along a conveying route, has a plurality of mounts arranged one beside the other along the longitudinal extent. The transporting element is designed in the form of a channel-like body with an accommodating space curved in the form of part of a circle, as seen in cross section, and encloses an angle of at least 180°. The mounts are designed in the form of slot-form apertures in that region of the channel-like body that is curved in the form of part of a circle. The apertures extending parallel to one another, and transversely to the longitudinal extent of the channel-like body, as far as longitudinal (Continued)

crosspieces on either side, these forming a respective longitudinal periphery.

7 Claims, 3 Drawing Sheets

(51) Int. Cl.
    *A47J 37/04*     (2006.01)
    *B65G 11/02*     (2006.01)
    *A23B 5/005*     (2006.01)
    *B65G 17/36*     (2006.01)
    *A23B 5/04*     (2006.01)
    *B65G 11/16*     (2006.01)
    *B65G 17/12*     (2006.01)

(52) U.S. Cl.
    CPC .............. *A23L 3/185* (2013.01); *A47J 37/045* (2013.01); *B65G 11/163* (2013.01); *B65G 17/36* (2013.01); *A23L 3/18* (2013.01); *A47J 29/06* (2013.01); *B65G 17/12* (2013.01); *B65G 2201/0208* (2013.01)

(58) Field of Classification Search
    USPC ...... 99/453, 477, 516, 517, 443 C, 427, 440
    See application file for complete search history.

(56) References Cited

U.S. PATENT DOCUMENTS

| | | | |
|---|---|---|---|
| 3,789,802 A * | 2/1974 | Conley | A01K 31/165 119/337 |
| 4,302,331 A * | 11/1981 | Condit, Jr. | B01D 33/327 198/713 |
| 6,419,698 B1 | 7/2002 | Wang et al. | |
| 6,471,042 B1 | 10/2002 | Van De Dungen et al. | |
| 6,620,449 B1 * | 9/2003 | Peers | A47J 29/00 426/438 |
| 7,000,530 B2 | 2/2006 | Damrath et al. | |
| 8,220,616 B2 * | 7/2012 | Manders | B65G 47/1471 198/453 |
| 9,550,627 B2 * | 1/2017 | Van Den Dungen | A22C 11/008 |
| 2009/0205509 A1 * | 8/2009 | Canicas | A21B 1/46 99/357 |

FOREIGN PATENT DOCUMENTS

| | | |
|---|---|---|
| DE | 102004012348 A1 | 9/2005 |
| DE | 69836505 T2 | 7/2007 |
| WO | 0044233 A1 | 8/2000 |

OTHER PUBLICATIONS

Written Opinion dated Mar. 18, 2015 in related International Application No. PCT/EP2014/079006.

* cited by examiner

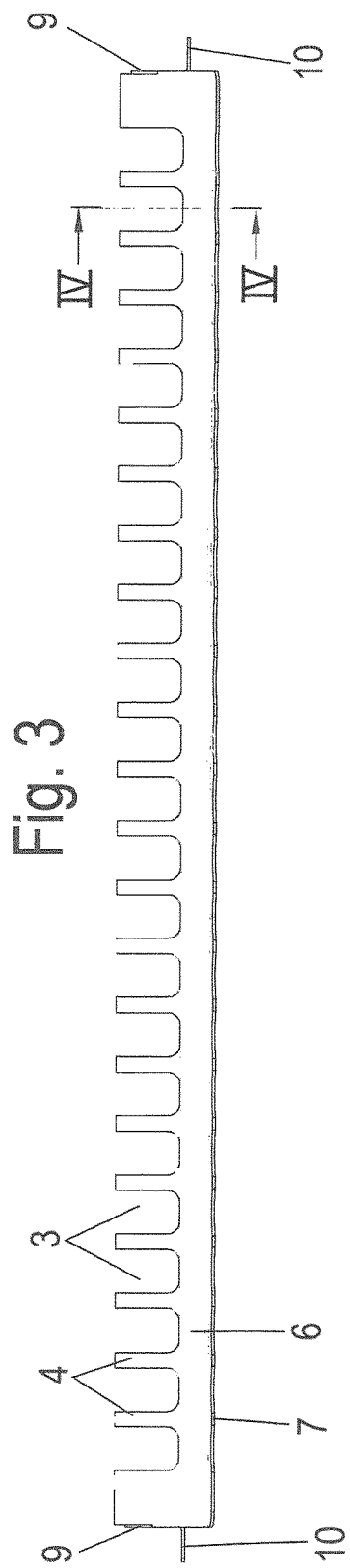
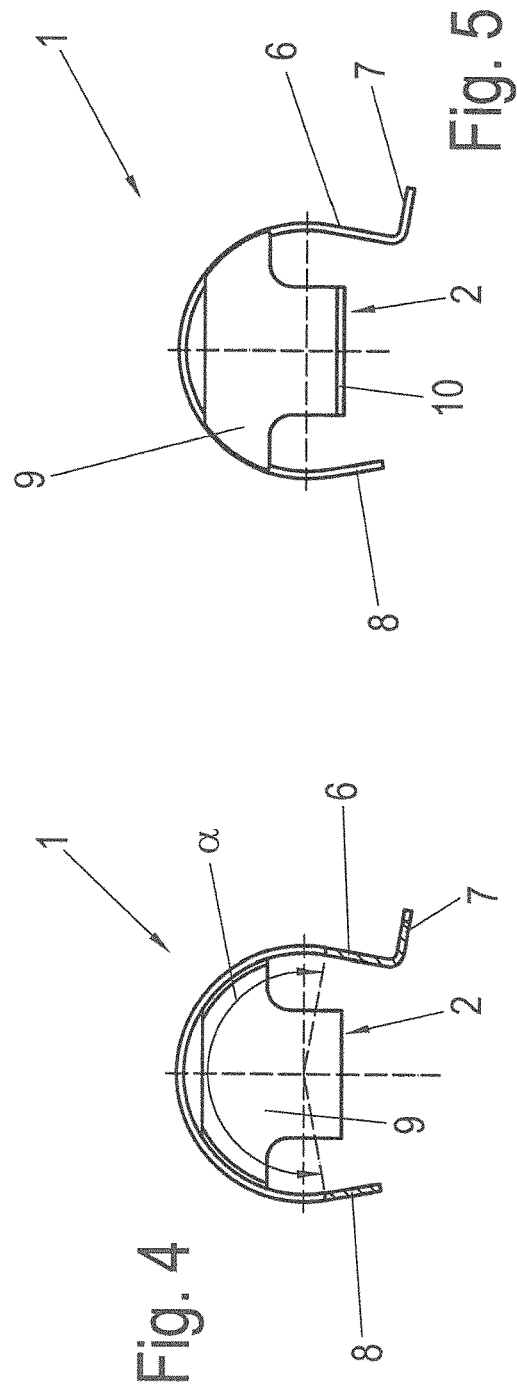

TRANSPORTING ELEMENT FOR ACCOMMODATING AND TRANSPORTING SPHERICAL, CYLINDRICAL OR EGG-SHAPED ARTICLES, AND A COOKING APPLIANCE, PASTEURIZER OR COOLING UNIT

BACKGROUND AND SUMMARY OF THE INVENTION

Exemplary embodiments of the present invention relate to a transporting element for accommodating and for transporting spherical, cylindrical or egg-shaped articles, in particular foodstuffs, especially eggs, and a cooking appliance, pasteurizer or cooling unit.

Generic transporting elements are used especially in cooking appliances, pasteurizers or cooling units for conveying eggs along a conveying route through the cooking appliance, pasteurizer or cooling unit. The conveying route within the pasteurizer or cooling unit is usually formed in such a way that as a result of the necessary treatment duration, e.g., during pasteurizing with water heated to approximately 60° C. with which the eggs are sprayed, the conveying route is formed in a meandering fashion in order to keep the transport path, which is covered horizontally, as short as possible and to allow forming the cooking appliance, pasteurizer or cooling unit as compact as possible.

German patent document DE 10 2004 012 348 A1 discloses a pasteurizing method and a pasteurizer formed for carrying out the method in which the eggs to be pasteurized are conveyed in rows lying adjacent to each other along the conveying route. Transporting elements are conventionally used to fix the eggs in their position in or on the transporting element.

It is important in such fixing that the eggshell surface covered by such fixing elements is kept as small as possible in order to spray the eggs over the largest possible area with the heated water.

Exemplary embodiments are directed to a transporting element for accommodating and for transporting such spherical, cylindrical or egg-shaped articles, especially foodstuffs such as eggs in particular, along a conveying route, with which the wettable exterior surface of the spherical, cylindrical or egg-shaped articles can be increased even further.

The transporting element in accordance with the invention is formed as a channel-like body, having an accommodating space for accommodating the spherical, cylindrical or egg-shaped articles, the accommodating space being curved in the form of part of a circle, as seen in the cross-section, and enclosing an angle of at least 180°, wherein the bearing positions in which the spherical, cylindrical or egg-shaped articles can be accommodated are designed in form of slot-shaped apertures in the region of the channel-like body that is curved in the form of part of a circle. The slot-shaped apertures extend in parallel to each other and transversely to the longitudinal extension of the channel-like body on either side up to longitudinal crosspieces forming a respective longitudinal edge.

It is possible with a transporting element formed in this manner to enable the treatment of the spherical, cylindrical or egg-shaped articles, especially eggs, over the entire surface when travelling through the conveying route, especially spraying the articles over the entire surface with water heated to approximately 60° C. when used in a pasteurizer, since the transporting element allows pivoting the transporting element, on the conveying route formed in a meandering manner, by 180° from a first position, e.g., in an ascending region of the conveying route, to a second position in a descending region of the conveying route, so that an egg situated loosely in a slot-shaped aperture of the transporting element changes its position along the slot following the pivoting movement within the slot. The contact region of the egg on the transporting element is thus changed in such a way that during the passage of the egg along the conveying route wetting of the entire surface of the egg with heated water is possible.

According to an advantageous embodiment, the apertures extend over an angular range of 150° to 190°, so that the spherical, cylindrical or egg-shaped food items always partly enter the slot-shaped aperture and thus also remain in the associated bearing position during or after the pivoting of the transporting element.

At least one of the longitudinal crosspieces forming the longitudinal edge of the channel-like body is preferably not curved at least in part, but is formed in a flat manner.

For increasing the stability of the transporting element in its longitudinal direction, at least one of the longitudinal crosspieces is formed in an especially preferred way in a bent manner away from the accommodating space along its exterior longitudinal edge.

According to a further advantageous embodiment of the invention, mounting elements for the pivotable bearing of the transporting element about a pivot axis parallel to the longitudinal axis of the transporting element are preferably provided on the face ends of the transporting element. The transporting elements can be fastened in a simple manner by means of the mounting elements on crosspieces provided for this purpose, which can be moved by a drive means such as a chain for example along the conveying route and thus entrain the transporting elements through the conveying route.

They are especially preferably formed in an integral manner and especially made from a stainless steel sheet for easier handling, especially mounting, and also for cleaning of the transporting elements.

The cooking appliance, pasteurizer or cooling unit in accordance with the invention, which comprises a cooking, pasteurizing or cooling space in which a conveying route is arranged, along which the spherical or egg-shaped foodstuff to be conveyed, especially eggs, can be transported in an entirely horizontally progressive manner, but up and down in a meandering fashion on transporting elements mounted in the conveying route, involves the transporting elements being formed as described above and are mounted to be pivotable about approximately 180° about a pivot axis oriented transversely to the conveying direction.

BRIEF DESCRIPTION OF THE DRAWING FIGURES

An embodiment of a transporting element in accordance with the invention will be explained below in closer detail by reference to the enclosed drawings, wherein:

FIG. 3 shows a side view of the transporting element with an illustration of the slot-shaped apertures and crosspieces;

FIG. 4 shows a cross-sectional view of the transporting element through a section marked with reference numeral IV in FIG. 3, and FIG. 5 shows a view of one of the face ends of the transporting element shown in FIG. 3.

DETAILED DESCRIPTION

Figure 1:
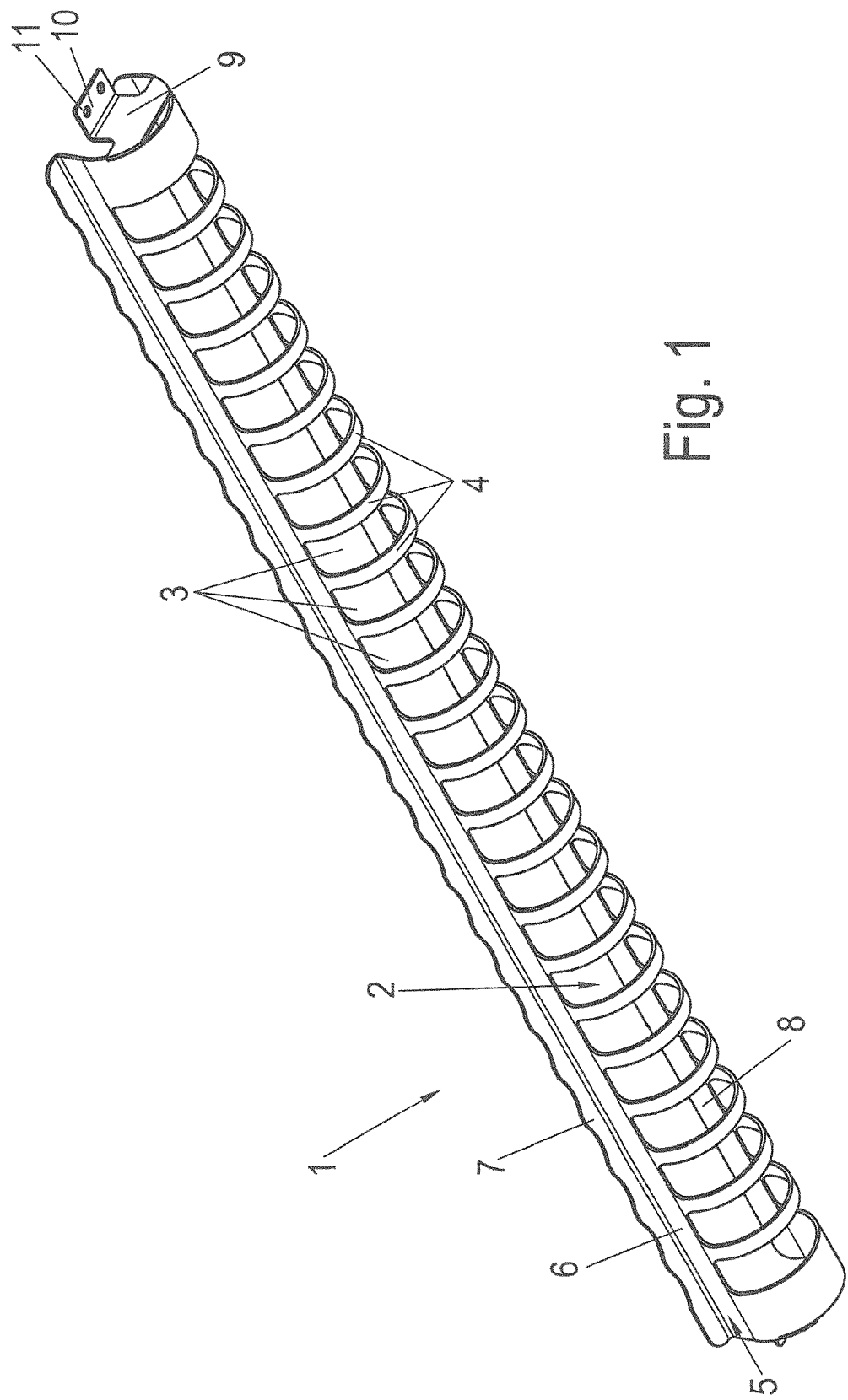
FIG. 1 shows a perspective view of an embodiment of a transporting element in accordance with the invention.
Figure 2:
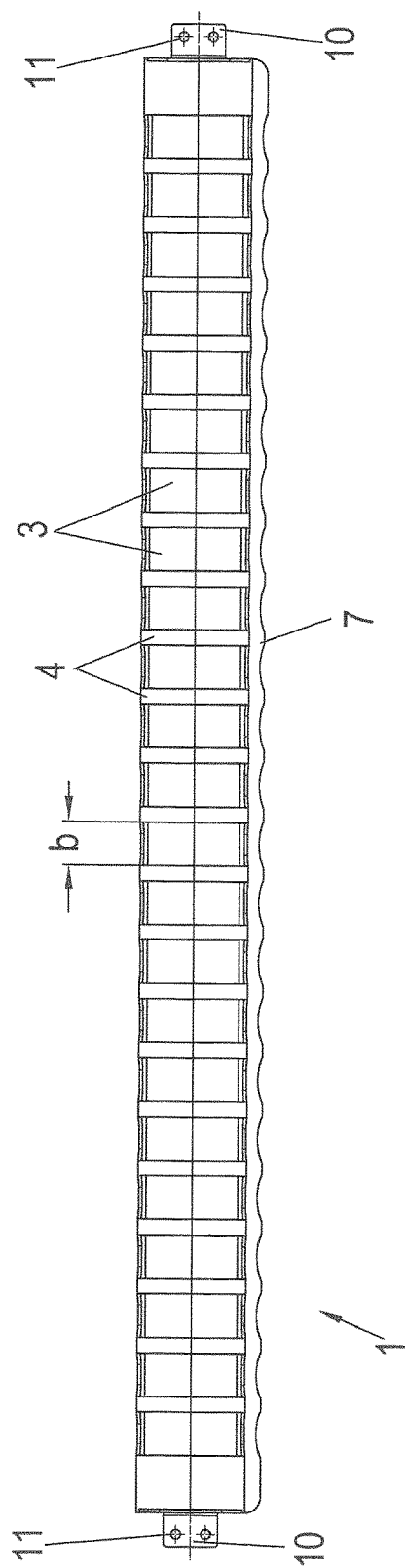
FIG. 2 shows a side view of the transporting element of FIG. 1 in a pivoted position.

In the following description of the drawings, terms such as top, bottom, left, right, front, rear, etc. exclusively relate to the exemplary illustration and position of the transporting element, transverse crosspieces, longitudinal crosspieces, mounting elements, apertures and the like selected in the respective figures. These references shall not be understood in a limiting manner, i.e., these references can change by various operating positions or through mirror-symmetric design or the like.

Furthermore, the invention will be explained in the following description of the drawings of the transporting element and the cooking appliance, pasteurizer, or cooling unit predominantly on the basis of an example of using such a transporting element in a pasteurizer. This shall not be understood in any way as a limitation to such use.

In FIGS. 1 to 5, an embodiment of a transporting element in accordance with the invention formed as a channel-like body 1 is designated with the reference numeral in its entirety.

As is shown especially well in FIG. 1, a base of the channel-like body 1 that is bent in the form of a part of a circle forms an accommodating space for accommodating the spherical, cylindrical or egg-shaped articles, especially eggs, which is surrounded by the base at an angle of at least 180°.

The base is provided slot-shaped apertures 3, which are used as bearing points for the spherical or egg-shaped foodstuffs, especially eggs. The slot-shaped apertures 3 are oriented in parallel with respect to each other, so that a plurality of eggs can be stored or accommodated in the longitudinal extension of the transporting element adjacent to one another.

The slot-shaped apertures 3 extend transversely to the longitudinal extension of the channel-like body 1 on both sides up to the longitudinal crosspieces 5, 8, which form the respective longitudinal edge of the channel-like body 1.

If a spherical, cylindrical or an egg-shaped article such as an egg is placed in such a slot-shaped aperture 3, the transporting element can be pivoted in an angular range of approximately 180° about its longitudinal axis without the spherical or egg-shaped foodstuff being likely to drop out of the open space 2. The mutual striking of several eggs situated adjacent to each other is prevented by partial insertion in the respective slot 3. The spherical or egg-shaped foodstuffs can move during the pivoting of the transporting element along the slot-shaped recess 3 transversely to the longitudinal extension of the channel-like body 1.

The width b of each of these slot-shaped apertures 3 is formed according to the diameter of the spherical or egg-shaped foodstuff. In the case of eggs as a foodstuff to be transported, the width b of the slot-shaped aperture 3 is dimensioned in such a way that it is smaller than the smaller diameter of the egg, so that the egg is unable to drop through the slot-shaped aperture 3.

In addition to the fixing of the transporting element in the longitudinal extension of the transporting element, this aperture 3 simultaneously allows spraying a majority of the eggshell surface with heated water.

The surface of the eggshell that cannot be reached by the respective spray nozzles is reached once the respective transporting element is pivoted during transport along the meandering conveying route preferably by approximately 180°. In this process, the egg rolls along the slot-shaped recess 3 from a first bearing position close to one of the longitudinal crosspieces 5 to a different second bearing position which is close to the other, opposite longitudinal crosspiece 8, so that in this position other regions of the eggshell surface are now covered by the channel-like body 1. The eggs can thus be sprayed over the entire surface with heated water in the course of conveyance along the conveying route.

In order to ensure sufficient guidance of the eggs in the slot-shaped apertures 3, the apertures 3 preferably extend over an angular range of 150° to 190°, preferably over an angular range of approximately 180°.

Longitudinal crosspieces 5 forming the respective longitudinal edge are preferably slightly oriented in an angular fashion with respect to each other and travelling towards each other at an angle α, as shown in FIG. 4.

At least one partial surface 6 of one of the longitudinal crosspieces 5, 8 or both longitudinal crosspieces 5, 8 is preferably formed in a flat way.

For the purpose of increasing the stability of the transporting element in the longitudinal direction, one of the longitudinal crosspieces 5, 8 is preferably formed along its exterior longitudinal edge to be bent away from the accommodating space 2 with a stiffening edge 7. It can also be considered to form both mutually opposite longitudinal crosspieces 5, 8 with such bent stiffening edges 7.

Respective mounting elements 9 for the pivotable bearing of the transporting elements about a pivot axis parallel to the longitudinal axis of the transporting elements are preferably provided on the face ends of the transporting elements for fixing the transporting elements to respective mounting points of a conveying apparatus, with which the transporting elements and thus the spherical, cylindrical or egg-shaped articles are conveyed along a conveying route, which in the described example occurs through a pasteurizer.

These mounting elements 9 are preferably formed as sheet-metal parts welded onto the face end of the channel-like body 1, which sheet-metal parts comprise tongues 10 with boreholes 11 provided therein, which tongues extend parallel to the longitudinal extension of the transporting element, for fastening the transporting element to respective fastening webs (not shown) of the conveying apparatus, e.g. by bolting or welding.

It is thus possible with transporting elements formed in this manner to transport a plurality of eggs in a row adjacent to each other along a conveying route into a pasteurizing space of a pasteurizer in an entirely horizontally progressing manner, thereby meandering up and down, wherein the dimensions of the pasteurizing space can be limited sufficiently by the meandering progression of the conveying route. It is further ensured by the pivotable bearing of the transporting element in such a pasteurizer that the eggs to be transported can be treated evenly and over the entire surface. In the case of pasteurizing, the eggs are sprayed with water heated to 60° C. by means of spray nozzles that are provided along the conveying route in the pasteurizing space. In the case of a respective cooking appliance, respectively hotter water can be used, and respectively colder water or another cooling medium in a cooling appliance.

LIST OF REFERENCE NUMERALS

1 Channel-like body
2 Accommodating space
3 Slot-shaped aperture

4 Crosspiece
5 Longitudinal crosspiece
6 Flat region
7 Bent region
8 Longitudinal crosspiece
9 Mounting elements
10 Tongue
11 Screw boreholes
b Slot width

The invention claimed is:

1. A transporting element for accommodating and for transporting spherical, cylindrical, or egg-shaped articles, the transporting element comprising:
    a channel shaped body having an accommodating space curved in a form of part of a circle, as seen in cross-section, and enclosing an angle of at least 180°, the channel-shaped body comprising first and second longitudinal crosspieces and a plurality of crosspieces having a first end connected to the first longitudinal crosspiece and having a second end connected to the second longitudinal crosspiece, wherein the plurality of crosspieces extend in parallel to each other and transversely to the first and second longitudinal crosspieces,
    wherein spaces between each of the plurality of crosspieces form corresponding bearing points arranged adjacent to each other along the first and second longitudinal crosspieces, wherein the bearing points are slot-shaped apertures arranged in a region of the channel-shaped body that is curved in the form of part of a circle, the slot-shaped apertures extending in parallel to each other and transversely to the first and second longitudinal crosspieces on either side up to the first and second longitudinal crosspieces, which form a respective longitudinal edge,
    wherein the transporting element is an integral component.

2. The transporting element of claim 1, wherein the slot-shaped apertures extend over an angular range of 150° to 190°.

3. The transporting element of claim 1, wherein at least one of the longitudinal crosspieces is at least partly flat.

4. The transporting element of claim 1, wherein at least one of the longitudinal crosspieces is curved away from the accommodating space along the at least one of the longitudinal crosspieces' exterior longitudinal edge.

5. The transporting element of claim 1, wherein mounting elements are arranged on end-faces of the transporting element to allow pivotable bearing of the transporting element about a pivot axis parallel to the longitudinal axis of the transporting element.

6. The transporting element of claim 1, wherein the transporting element is made from a stainless-steel sheet.

7. A cooking appliance, pasteurizer or cooling unit, comprising:
    a cooking, pasteurizing or cooling space in which a conveying route is arranged, along which a spherical, cylindrical or egg-shaped foodstuff to be conveyed is transported in its entirety in a horizontally progressing manner, but meandering upwardly and downwardly, on transporting elements mounted in the conveying route,
    wherein each of the transporting elements comprises
        a channel-shaped body having an accommodating space curved in a form of part of a circle, as seen in cross-section, and enclosing an angle of at least 180°, the channel-shaped body comprising first and second longitudinal crosspieces and a plurality of crosspieces having a first end connected to the first longitudinal crosspiece and having a second end connected to the second longitudinal crosspiece, wherein the plurality of crosspieces extend in parallel to each other and transversely to the first and second longitudinal crosspieces,
        wherein spaces between each of the plurality of crosspieces form corresponding bearing points arranged adjacent to each other along the first and second longitudinal crosspieces, wherein the bearing points are slot-shaped apertures arranged in a region of the channel-shaped body that is curved in the form of part of a circle, the slot-shaped apertures extending in parallel to each other and transversely to the first and second longitudinal crosspieces on either side up to the first and second longitudinal crosspieces, which form a respective longitudinal edge, and a width of the slot-shaped apertures is dimensioned so that one single egg or egg-shaped foodstuff is partially inserted into a respective one of the slot-shaped apertures,
    wherein each of the transporting elements is pivotably mounted approximately 180° about a pivot axis oriented transversely to the conveying direction.

* * * * *